March 11, 1958 W. R. ECHOLS 2,826,434
HELICOPTER TOWBAR
Original Filed Oct. 2, 1952 2 Sheets-Sheet 1

INVENTOR
WILFORD RAY ECHOLS
BY Baldwin & Wight
HIS ATTORNEYS

March 11, 1958
W. R. ECHOLS
2,826,434
HELICOPTER TOWBAR
Original Filed Oct. 2, 1952
2 Sheets-Sheet 2
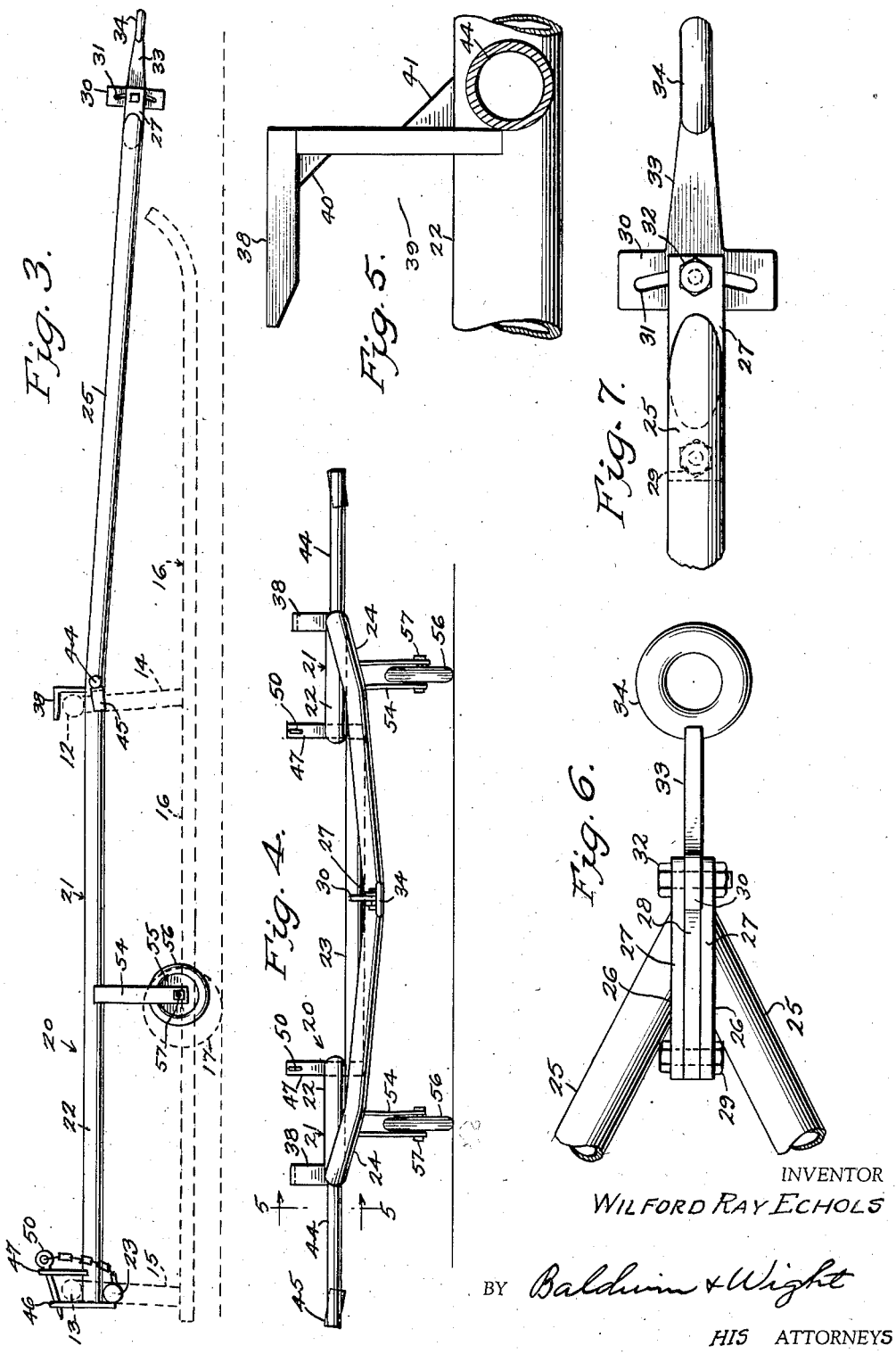
INVENTOR
WILFORD RAY ECHOLS
BY Baldwin & Wight
HIS ATTORNEYS

United States Patent Office 2,826,434
Patented Mar. 11, 1958

2,826,434

HELICOPTER TOWBAR

Wilford Ray Echols, Coahoma, Tex.

Substituted for abandoned application Serial No. 312,740, October 2, 1952. This application May 3, 1957, Serial No. 660,018

5 Claims. (Cl. 280—490)

This invention relates to a towbar, and more particularly to a towbar for supporting a helicopter to be towed wherever desired.

An important object of the invention is to provide a novel and simple type of towbar particularly intended for use in pulling or towing helicopters to and from the hangars therefor.

A further object is to provide such a device having connecting members associated therewith particularly adapted for engaging the cross members of certain types of helicopters to effectively hold the latter in position while being towed.

A further objecct is to provide such a construction which may be quickly and easily placed in position beneath the helicopter and connected to the cross bars thereof at substantially spaced points, wherein two simple fastening elements are all that is necessary for securely fixing the cross bars relative to the towbar.

A further object is to provide such a towbar structure wherein the means engageable with the forward cross bar of the helicopter requires the use of no means for fixing such cross bar relative thereto, the forward cross bar, when in position, being movable solely in a rearward direction, and which direction of movement is prevented by the rear cross bar engaging means and the simple fastening elements associated therewith.

A further object is to provide such a device having a novel type of adjustable draft connection so as to permit the connection of the towbar to a tractor in such way as to provide for the towing of the helicopter and the skids thereof in proper equilibrium relative to the surface over which the helicopter is towed.

Other objects and advantages of the invention will become apparent during the course of the following description.

The instant application is a substitute for application Serial No. 312,740, filed October 2, 1952, now abandoned.

In the drawings I have shown one embodiment of the invention. In this showing:

Figure 3 is a side elevation of the towbar, the latter being shown in position for towing the helicopter, the undercarriage of the latter being shown in dotted lines;

Figure 4 is a front elevation of the towbar;

Figure 5 is an enlarged section on line 5—5 of Figure 4 showing one of the upstanding forward cross bar engaging elements;

Figure 6 is an enlarged fragmentary plan view of the forward end of the towbar showing the adjustable draft conneciton; and Figure 7 is a side elevation of the same.

Figure 1:
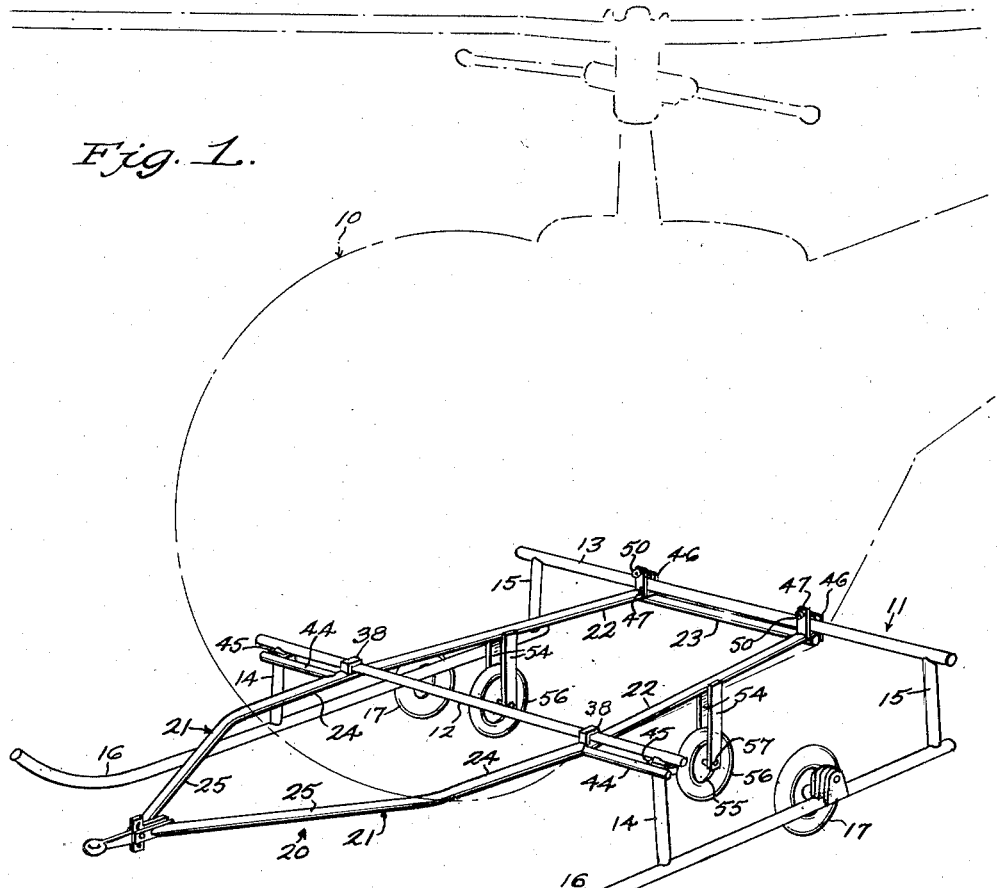
Figure 1 is a perspective view of the device showing the helicopter cross bars in position thereon, portions of the helicopter proper being shown in broken lines.

Referring to Figure 1, the numeral 10 designates as a whole a helicopter of well-known type having an undercarriage indicated as a whole by the numeral 11. This undercarriage comprises forward and rear cross members 12 and 13, respectively, provided at their ends with downwardly extending posts 14 and 15 which slightly diverge from each other both longitudinally and transversely and which have connected to their lower ends conventional skids 16 provided with wheels 17.

The structure forming the subject matter of the present invention comprises a wheeled towbar indicated as a whole by the numeral 20 and comprising a pair of side frame members each of which is indicated as a whole by the numeral 21. Each of the side frame members comprises straight rear portions 22 which slightly converge rearwardly, as shown in Figure 1, and are rigidly connected at their rear extremities by an underlying cross bar 23 suitably welded to the side frame members. Forwardly of the rearwardly converging portions 22, the side frame members are provided with forward portions 24 which converge forwardly to a slight extent and slightly slope downwardly, and merge at their forward ends to more sharply forwardly converging portions 25.

At their forward extremities, the frame portions 25 have their ends cut off at angles, as at 26, and have respectively welded thereto parallel plates 27 which are spaced from each other as shown in Figure 6. Between the plates 27 is arranged an adjusting plate 28 the rear extremity of which is connected by a bolt 29 to the rear portions of the plates 27. At its forward end, the plate 27 is provided with an adjusting head 30 extending above and below the plate 28 and provided with a slot 31 formed as an arc of a circle concentric with the bolt 29. A second bolt 32 extends through the slot 31 and through the forward ends of the plates 27. Forwardly of the head 30 an integral connecting member 33 is shaped at its forward end to fit a draft eye 34 and is welded to such eye. This eye is adapted for connection through any suitable type of hitch with a tractor by which the helicopter is moved from place to place.

At the junctions of the portions 22 and 24 of each side frame is arranged an inverted L-shaped clip 38 forming with the associated slide frame member a rearwardly opening recess 39 to receive the cross member 12. The clips 38 may be formed integral or of separate welded pieces, as specifically shown in Figure 5, and a corner block 40 may be welded in the angle of each clip to reinforce it. A similar corner block 41 may be arranged forwardly of each clip to reinforce it relative to the associated side frame member 21.

It will be apparent from Figure 1 that the width of the frame 20 is substantially less than the space between the skids 16 and their posts 14 and 15. Each side frame member is provided with an outstanding arm 44 securely welded thereto, and to the outer end of each arm 44 is welded a U-shaped clip 45, as clearly shown in Figure 2. Each clip 45 is slightly inclined in accordance with the inclination of the posts 14, and such posts are received in the respective clips 45 when the connecting members 12 are arranged in the clips 38, as shown in Figure 1.

Adjacent the rear end of each side frame member 21 there is provided means for receiving and fixing in position the rear cross member 13 of the helicopter. Each such means comprises a rear plate 46 which is preferably welded against the rear end of the associated side frame member 21 and is preferably also welded to the cross bar 23. Forwardly of each plate 46 and spaced therefrom is a second plate 47 shaped as at 48 to fit the transverse curvature of the associated side frame portion 22, and each plate 47 is securely welded to its associated side frame member. The plates 46 and 47 are suitably apertured to receive a slidable pin 49 having an eye 50 preferably connected to one end of a short section of chain 51, the opposite end of which is welded or otherwise connected to the cross bar 23 to prevent the loss of the pin 49. It will be noted that each plate 47 extends substantially higher than its associated plate 46 and that the slidable pin extends downwardly at an angle, so that after it is inserted it will be retained in position by gravity.

Each side frame portion has welded thereto a pair of depending arms 54 spaced from each other to receive between their lower ends a wheel 55, preferably provided with a tire 56 of the semi-pneumatic type. Each wheel is mounted on an axle 57 extending through the associated arms 54. Because of the slight rearward convergence of the frame portions 22, the arms 54 are slightly twisted to arrange the wheels 55 in parallelism.

Operation

The present device comprises a very simple towbar structure having wheels 55 to support it for easy movement from place to place, and such movement of the towbar obviously may be carried out manually because of the lightness of the structure. Assuming that a helicopter of the type with which the present structure is intended to be used is to be moved from its hangar, the operator will wheel the towbar into the hangar and, in approaching the helicopter forwardly thereof, he will slightly tilt the frame 20 while wheeling the towbar rearwardly so that the plates 46 and 47 will pass beneath and clear the cross member 12. As it is moved rearwardly, the tow bar momentarily may assume a more nearly horizontal position so that the side frame members will move beneath the cross member 12. The rearward movement is continued until the clips 38 approach positions just forwardly of the cross bar 12, whereupon the forward end of the towbar is raised as the towbar is moved rearwardly until the cross bar 12 becomes positioned in the clips 38. The forward end of the towbar as then moved downwardly, the rear end of the towbar being raised to position the cross member 13 between the plates 46 and 47 and the wheels 55 being raised out of contact with the surrounding surface.

Figure 2:
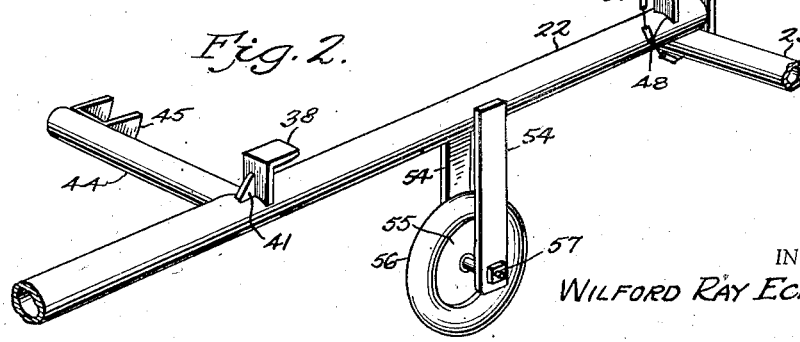
Figure 2 is an enlarged fragmentary perspective view of a portion of the towbar frame and associated elements forming that side of the towbar remote from the observer in Figure 1.

The foregoing operations obviously take place with the pins 49 removed. When such operations are completed, the parts will be in the final operative positions and the pins 49 are then inserted as shown in Figure 2.

No fastening means of any kind are required to hold the forward cross member 12 in position. The clips 38 and 45 function to prevent horizontal movement of the cross member in any direction except rearwardly. The plates 46 prevent such movement, and accordingly serve to hold the towbar in proper position relative to the undercarriage of the helicopter. The cross member 12 can be released from the clips 38 and 45 only by forward movement of these clips, and this can be accomplished only by the lowering of the rear end of the frame followed by horizontal forward movement thereof. Such downward movement of the rear end of the frame is prevented by the pins 49. These pins themselves require no fastening elements but may be made merely slidable, due to the inclination of the pins, these pins therefore being held in position by gravity until they are manually pulled out of the plates 46 and 47.

Particular attention is invited to the fact that the wheels 55 are intended solely to support the towbar 20 to render the latter readily movable from place to place and to maneuver it into engagement with the cross members 12 and 13. As clearly shown in Figure 3, the helicopter wheels 17, when the towbar is in operative engagement with the cross members 12 and 13, extend below the wheels 55, the latter completely clearing the ground. Therefore, when in operation, the towbar is completely supported by the helicopter and serves solely as a towbar. The adjusting means, shown in Figures 6 and 7, is important since it provides for the connection of the towbar to a tractor while maintaining the skids 16 relatively horizontal, clear of the ground, and the helicopter is held in equilibrium while being pulled by the tractor. The adjusting means is also important for the reason it provides simple and novel means for clamping the forward ends of the converging frame portions 25 rigidly with respect to each other in the operation of the device.

Disconnection of the towbar from the helicopter may be quickly and easily accomplished. It merely is necessary to pull out the pins 49, whereupon the rear end of the towbar will swing downwardly and the towbar may then be pulled forwardly. When the rear end of the towbar is dropped, the cross member 13 clears the tops of the plates 46, thus rendering the towbar free to move forwardly to disengage the clips 38 from the cross bar 12. The towbar, resting on its wheels 55, then may be pulled forwardly from beneath the helicopter.

From the foregoing it will be apparent that the present construction provides a highly simplified towbar for use particularly for hauling or towing from place to place structures, such as helicopters, having undercarriages particularly including cross members 12 and 13. The structure is light and in itself is readily transportable by hand, and it may be placed in operative position with respect to, or disconnected from, the undercarriage of a helicopter through the performance of simple connecting and disconnecting steps, as described above.

The construction shown for the purposes of illustration embodies the invention in a preferred form, but it is intended that the disclosure be illustrative rather than definitive of the invention. The invention is defined in the claims.

I claim:

1. A towbar for pulling a helicopter having an undercarriage comprising forward and rear parallel cross members lying substantially in a common horizontal plane, skids beneath said cross members and posts connected between said cross member and said skids, said towbar comprising a frame formed of a pair of side frame members and of a width less than the distance between said skids, a pair of rearwardly opening clips carried by and rigid with the respective side frame members for receiving the forward cross member, upwardly opening clips carried by and rigid with the respective side frame members adjacent the rear ends thereof for receiving the rear cross member, arms carried by the respective side frame members and projecting outwardly therefrom, and means carried by said arms and engageable with certain of said posts for preventing lateral movement of the helicopter relative to said frame.

2. A towbar for pulling a helicopter having an undercarriage comprising forward and rear parallel cross members lying substantially in a common horizontal plane, skids beneath said cross members and posts connected between said cross members and said skids, said towbar comprising a frame formed of a pair of side frame members and of a width less than the distance between said skids, a pair of rearwardly opening clips carried by and rigid with the respective side frame members for receiving the forward cross member, upwardly opening clips carried by and rigid with the respective side frame members adjacent the rear ends thereof for receiving the rear cross member, arms carried by the respective side frame members and projecting outwardly therefrom, and rearwardly opening clips carried by the respective arms to receive certain of said posts to prevent lateral movement of the helicopter relative to said frame.

3. A towbar for pulling a helicopter having an undercarriage comprising forward and rear parallel cross members lying substantially in a common horizontal plane, skids beneath said cross members and posts connected between said cross member and said skids, said towbar comprising a frame formed of a pair of side frame members and of a width less than the distance between said skids, a pair of rearwardly opening clips carried by and rigid with the respective side frame members for receiving the forward cross member, upwardly opening clips carried by and rigid with the respective side frame members adjacent the rear ends thereof for receiving the rear cross member, arms carried by the respective side frame members and projecting outwardly therefrom, means carried by said arms and engageable with certain of said posts for preventing lateral movement of the helicopter relative to said frame, each of said upwardly opening clips comprising a pair of spaced plates, one arranged forwardly of the other and extending higher than such other plate, each such pair of plates having downwardly and rearwardly inclined aligned openings, and a pin slidable in such openings.

4. A towbar for pulling a helicopter having an undercarriage comprising forward and rear parallel cross members lying substantially in a common horizontal plane, skids beneath said cross members and posts connected between said cross members and said skids, said towbar comprising a frame formed of a pair of side frame members and of a width less than the distance between said skids, a pair of rearwardly opening clips carried by and rigid with the respective side frame members for receiving the forward cross member, upwardly opening clips carried by and rigid with the respective side frame members adjacent the rear ends thereof for receiving the rear cross member, arms carried by the respective side frame members and projecting outwardly therefrom, rearwardly opening clips carried by the respective arms to receive certain of said posts to prevent lateral movement of the helicopter relative to said frame, each of said upwardly opening clips comprising spaced, forward and rear, vertically extending plates, the forward plate of each such clip extending substantially above the rear plate, the plates of each upwardly opening clip having downwardly and rearwardly inclined aligned openings, and a pin slidable in such openings.

5. A towbar for pulling a helicopter having an undercarriage including spaced parallel forward and rear cross members lying substantially in a common horizontal plane, a pair of skids beneath said cross members, and forward and rear posts connecting each cross member to one of said skids, said towbar comprising a pair of side frame members and being of a width less than the distance between said skids, an upwardly opening clip carried by and rigid with the rear end of each frame member and comprising spaced vertical plates to receive the rear cross member therebetween, an angle clip carried by and rigid with each said frame member and forward of an upwardly extending portion fixed at its lower end to the associated side frame member and an upper rearwardly extending portion spaced above such side frame member, each angle clip cooperating with its associated side frame member to provide a rearwardly opening recess for receiving the forward cross member, an arm fixed to each side frame member adjacent the associated angle clip and projecting outwardly, and a U-clip carried by the outer end portion of each arm and opening rearwardly to receive one of said forward posts.

References Cited in the file of this patent

UNITED STATES PATENTS

| | | |
|---|---|---|
| 1,357,177 | Loening | Oct. 26, 1920 |
| 1,456,875 | Jacobsen | May 29, 1923 |
| 1,637,789 | Schnitzer | Aug. 2, 1927 |
| 2,108,747 | Glover | Feb. 15, 1938 |
| 2,186,060 | Batey et al. | Jan. 9, 1940 |
| 2,361,951 | Livermon | Nov. 7, 1944 |
| 2,415,771 | Van Agtmael | Feb. 11, 1947 |
| 2,456,868 | Dominic | Dec. 21, 1948 |
| 2,562,596 | Bonfietti | July 31, 1951 |
| 2,620,201 | Brady | Dec. 2, 1952 |

FOREIGN PATENTS

| | | |
|---|---|---|
| 19,850 | Great Britain | of 1913 |
| 209,055 | Switzerland | June 1, 1940 |